United States Patent [19]

Fosnight et al.

[11] Patent Number: 5,288,055
[45] Date of Patent: Feb. 22, 1994

[54] BRACE FOR A VALVE PACKING GLAND FLANGE

[75] Inventors: Jerry L. Fosnight, Fairfield; Thomas R. Bendixen, Antioch; Kenneth J. Daigle, Martinez; Dennis E. Lines, Pittsburg, all of Calif.

[73] Assignee: Shell Oil Company, Houston, Tex.

[21] Appl. No.: 34,927

[22] Filed: Mar. 19, 1993

[51] Int. Cl.⁵ .................... F16K 41/04; F16J 15/20
[52] U.S. Cl. ..................... 251/214; 277/105; 137/315
[58] Field of Search ............... 251/214; 277/102, 105, 277/106; 137/315

[56] References Cited

U.S. PATENT DOCUMENTS

| | | | |
|---|---|---|---|
| 793,461 | 6/1905 | Mossman | 277/105 |
| 1,627,945 | 5/1927 | Wigle | 277/105 |
| 1,995,395 | 3/1935 | Mohr | 251/214 |
| 2,056,687 | 10/1936 | Moseley | 277/105 |
| 3,265,398 | 8/1966 | Hansen et al. | 277/105 |
| 4,156,529 | 5/1979 | Hafele | 277/105 |
| 4,601,304 | 7/1986 | Schobl | 251/214 |
| 4,773,442 | 9/1988 | Lephilibert | 277/106 |

*Primary Examiner*—George L. Walton

[57] ABSTRACT

The invention comprises a brace which may be used in a conventional valve assembly for holding the packing gland flange in place while valve components are repacked, repaired, and/or replaced. The brace is put in place around the valve stem and wedged between the gland flange and the yoke. The brace comprises a section of pipe cut into two longitudinal sections and held in place by a pipe clamp. The brace is preloaded by adjustment of jacking screws located between the brace body and the valve yoke. When in place, the brace will hold the valve gland flange together while the gland flange bolts e.g., are replaced. The brace may be left in position if desired as added reinforcement for perhaps a cracked gland flange.

5 Claims, 1 Drawing Sheet

BRACE FOR A VALVE PACKING GLAND FLANGE

FIELD OF THE INVENTION

The invention is directed to a method and apparatus for servicing and repairing valves while in service.

BACKGROUND OF THE INVENTION

In valves used for transporting toxic and/or dangerous gases and fluids, it has become necessary to frequently adjust packing and/or inject fluid re-pack into packing for in-service valves to meet the stringent requirements of government rules and regulations regarding fugitive emissions. Due to the leak-sealing capability of various types of packing, the design of valves, and the metallurgy of the valve, it is possible that damage may occur to the valve while attempting to meet the rules. Caution, therefore, must be exercised when adjusting the packing of valves in-service. The purpose of the invention is to reduce the risk to personnel from valve damage and to prevent contamination of the environment.

SUMMARY OF THE INVENTION

The invention comprises a brace which may be used in a conventional valve assembly, such as those manufactured by Stockham Valves and Fittings Co. of Birmingham, Ala., for holding the packing gland flange in place while valve components are repacked, repaired, and/or replaced. The brace is put in place around the valve stem and wedged between the gland flange and the yoke. The brace comprises a section of pipe cut into two longitudinal sections and held in place by a pipe clamp. The brace is preloaded by adjustment of jacking screws located between the brace body and the valve yoke. When in place, the brace will hold the valve gland flange together while the gland flange bolts e.g., are replaced. The brace may be left in position if desired as added reinforcement for perhaps a cracked gland flange.

The brace design also allows for future packing adjustments even if the gland flange is broken or if the gland flange studs are inoperable.

DETAILED DESCRIPTION OF THE INVENTION

It is frequently necessary to reseal the stuffing box of a valve or to replace bolts, etc. Attempting these procedures on an in-service, ductile, iron valve that has become distorted, damaged or has a cracked packing follower, can present serious personnel safety problems in addition to problems associated with releasing toxic and/or dangerous gaseous or liquid fluids to the environment.

Repairs are designed to eliminate fugitive emissions through the valve packing, the most vulnerable leak path in a valve design, without injury to personnel. The procedure incorporates a packing injector that will allow the introduction of a viscous re-packing material into the depleted stuffing box area. The re-pack material acts as a barrier to the service fluid, infiltrating the packing's minute leak paths, thereby changing the total leak mechanics through the valve packing. This dramatically improves the ability to seal valve packing, even for frequently cycled valves in dry gas service. The packing injector will permit the replenishment of the packing while the valve is in service, greatly reducing the maintenance effort to keep the valve packings emissions free. Great pressures are involved, therefore, damage may occur to weakened components.

During this procedure, the gland flange bolts can be reconditioned in place. If unacceptable, they are replaced. This provides for a longer lasting repair, as it is very important that the flange bolts are operable. This invention ensures safety to personnel and the environment, while replacing gland flange bolts, by the use of a packing gland/follower retainer or brace. The brace holds the packing follower in place while the flange bolts are replaced one at a time.

Whenever work is to be done on a ductile iron valve, the brace is installed on the valve prior to it being "shot" with packing materials. If the existing gland flange is not cracked, the brace may be removed after the valve packing box is sealed. If the gland flange is cracked, however, the brace should be left in place until the valve can be pulled out of service for repair/replacement.

Figure 1:
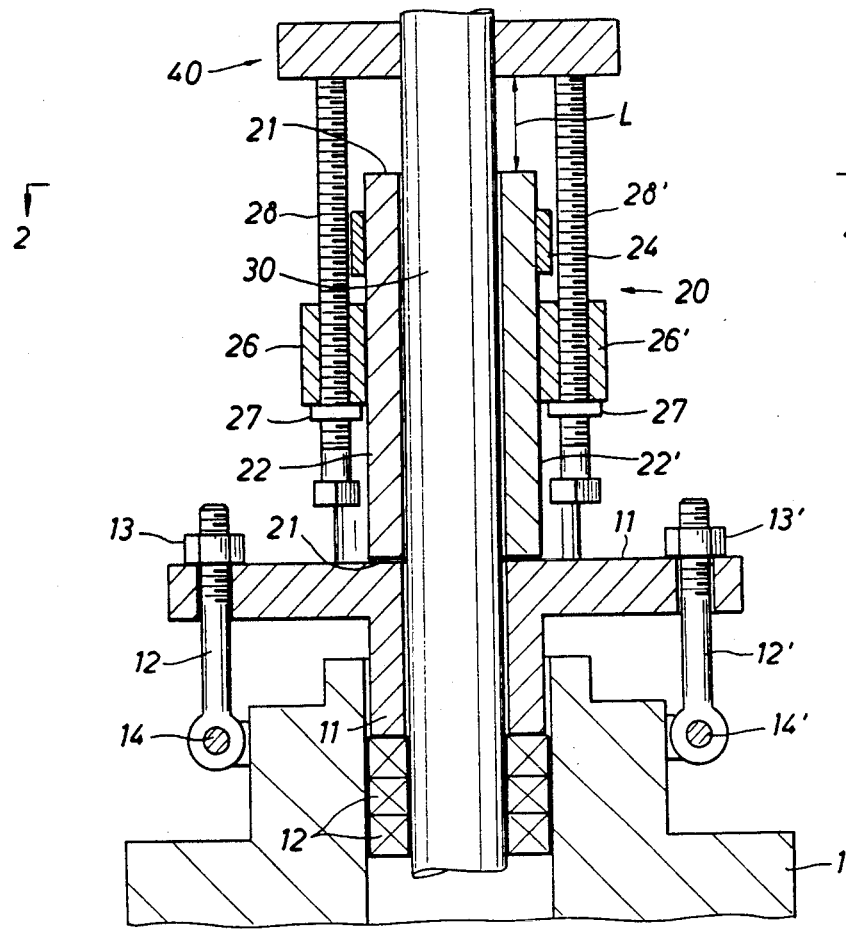
FIG. 1 is a sectional view of a typical valve bonnet and yoke with the brace in place.
Figure 2:
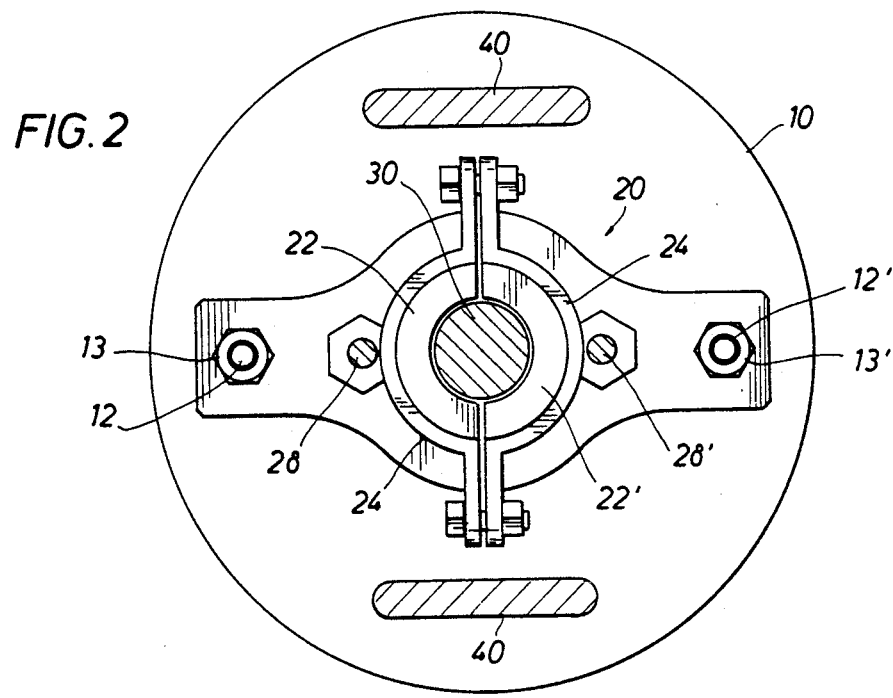
FIG. 2 is a sectional view taken along the line 2—2 of FIG. 1.

FIG. 1 depicts a cross-section of the valve body area 10 showing where the brace 20, the present invention, is to be installed. FIG. 2 is a view from above taken along the line 2—2 of FIG. 1, with the brace 20 and valve stem 30 shown. A length of heavy-wall, carbon steel pipe 22, 22' (split in half lengthwise) is placed around the valve stem 30 and secured in place with a pipe clamp 24, such as a standard Grinnell pipe clamp. The bottom 21' of the brace 20 rests on the top of gland flange 11. The gland flange 11 is movably secured to the valve body 10 by means of flange bolts 12, 12' (shown as eye-bolts) and flange bolt nuts 13, 13'. Eye bolts 12, 12' are rotatably secured to valve body 10 by means of keeper pins 14, 14' on the valve body 10. The gland 11' can thus be moved with relation to the valve body 10 by tightening the nuts 13, 13'. This will serve to compress the packing rings 15.

Welded to each side of the half-pipe 22, 22', near the middle is a nut 26, 26' such as a Grinnell steel rod coupling. A steel jacking bolt or set screw 28, 28' is then screwed into each coupling 26, 26' to allow for adjustment of the brace 20. The brace 20 is loaded by tightening the bolts 28, 28', by means of appropriate fittings thereon, so as to force the tops of the bolts against the underside of the yoke 40, and the bottom of 21' of the brace 20 against the top of gland flange 11. An adjustment length "L" of $\frac{1}{4}$" to $\frac{1}{2}$" is permitted between the top 21 of the brace 20 and the bottom side of valve yoke 40. A jam nut 27, 27' can then be installed on the jacking screws 28, 28', butted against the bottoms of the nuts 26, 26' to prevent the screws 28, 28' from loosening during operation of those valves where the brace will be left in place. A hose clamp or steel band (such as those used for insulation sheathing) should be wrapped around the gland flange bolts 12, 12' to prevent them from pivoting outward should the gland flange 11 fail. This clamp (not shown for clarity) should be installed around the bolts between the gland flange 11 and the valve body 10 before the stuffing box is "shot" with packing material. This clamp can be removed along with the brace 20 if the gland flange 11 is not cracked, but should remain on the valve if the gland flange 11 is broken. The valve stem 30 must move freely inside the split pipe 22, 22', therefore there should be some clearance between the pipe ID and the valve stem 30. In FIG. 2, the two pipe halves 22, 22' are shown as not meeting for purposes of illustration. It will be appreciated, however, that the two halves 22, 22' must touch in order for them to stand off from the valve stem 30.

The design of the valve provides access to the valve stem 30 through the arch-shaped yoke 40. The yoke, shown generally at 40, is attached to the body 10 at each lower end and rises to meet at the valve stem 30 centerline at the valve handwheel.

The gland flange brace 20 allows for adjusting the packing rings 15 on damaged valves even after being leak sealed. The packing 15 is normally adjusted by equally tightening the gland flange stud nuts 13, 13'. If the stud bolts 12, 12' are inoperable, or the gland flange 11 is cracked, this conventional method will not work. With the brace 20 installed, however, even damaged valves can be adjusted by tightening the jackscrews 28, 28'.

What is claimed:

1. A brace for use in a valve having a valve body, a yoke, a valve stem and a stuffing box having packing disposed therein, said brace comprising:
   a pipe section, said pipe section being cut into two longitudinal sections for placement around said valve stem and within said yoke and above said stuffing box, wherein an upper portion of said pipe section is adjustably spaced from a lower portion of said yoke and wherein a lower portion of said pipe section engages an upper portion of said stuffing box;
   a clamp attached around said longitudinal pipe sections for holding said pipe sections in place around said valve stem;
   a threaded nut fixedly attached to each of said pipe sections such that the axis of each nut and the axis of said pipe sections are parallel; and
   a jacking screw in each of said threaded nuts, the head of said jacking screw being adapted to abut the underside of said yoke, wherein the tightening of said jacking screws within said threaded nuts increases the distance between said upper portion of said pipe section and said lower portion of said yoke and wherein said increase in distance lowers said lower portion of said pipe section and lowers said upper portion of said stuffing box which the lower portion of said pipe section engages, thereby compressing said packing disposed in said stuffing box, thereby increasing the leak-sealing between said valve body and said valve stem.

2. A brace for use in a valve having a valve body, a yoke, a valve stem and a stuffing box having packing disposed therein, said brace comprising:
   a pipe section, said pipe section being cut into two longitudinal sections for placement around said valve stem and within said yoke and above said stuffing box, wherein an upper portion of said pipe section is adjustably spaced from a lower portion of said yoke;
   a clamp attached around said longitudinal pipe sections for holding said pipe sections in place around said valve stem;
   a threaded nut fixedly attached to each of said pipe sections such that the axis of each nut and the axis of said pipe sections are parallel;
   a gland movably fixed within said stuffing box, wherein an upper portion of said gland engages a lower portion of said pipe section; and
   a jacking screw in each of said threaded nuts, said jacking screw being adapted to apply pressure between said gland and said yoke, wherein the tightening of said jacking screws within said threaded nuts increases the distance between said upper portion of said pipe section and said lower portion of said yoke and wherein said increase in distance lowers said lower portion of said pipe section and lowers said gland which the lower portion of said pipe section engages, thereby compressing said packing disposed in said stuffing box, thereby increasing the leak-sealing between said valve body and said valve stem.

3. A brace for use in a valve having a valve body, a yoke, a valve stem, a stuffing box having packing disposed therein, and a valve gland, said brace comprising:
   a pipe section, said pipe section being cut into two longitudinal sections for placement around said valve stem and within said yoke and above said valve gland, wherein an upper portion of said pipe section is adjustably spaced from a lower portion of said yoke;
   means for holding said pipe sections in place around said valve stem;
   a gland movably fixed within said stuffing box, wherein an upper portion of said valve gland engages a lower portion of said pipe section; and
   means for applying a mechanical force between said yoke and said valve gland, wherein when said means for applying a mechanical force between said yoke and said valve gland is adjusted to increase said mechanical force, there is an increase in distance between said upper portion of said pipe section and said lower portion of said yoke and wherein said increase in distance lowers said lower portion of said pipe section and lowers said valve gland which the lower portion of said pipe section engages, thereby compressing said packing disposed in said stuffing box, thereby increasing the leak-sealing between said valve body and said valve stem.

4. The brace of claim 3 wherein said means for applying a mechanical force comprises:
   a threaded nut fixedly attached to each of said pipe sections such that the axis of each nut and the axis of said pipe sections are parallel; and
   a jacking screw through each combination of said threaded nuts.

5. The brace of claim 3 wherein said means for holding comprises a pipe clamp fixedly surrounding said pipe sections when said pipe sections are mated.

* * * * *